United States Patent [19]

Reid

[11] Patent Number: 4,767,978
[45] Date of Patent: Aug. 30, 1988

[54] HYBRID SWITCHING CIRCUIT IN A DC TO DC CONVERTER

[75] Inventor: Starlin M. Reid, Porter, Tex.

[73] Assignee: Halliburton Company, Duncan, Okla.

[21] Appl. No.: 855,569

[22] Filed: Apr. 25, 1986

[51] Int. Cl.⁴ .............................................. G05F 1/56
[52] U.S. Cl. ...................................... 323/282; 363/20; 323/287; 323/351
[58] Field of Search ................................... 363/15–21, 363/47, 48; 323/222, 223, 272, 282, 286, 287, 344, 351, 355

[56] References Cited

U.S. PATENT DOCUMENTS

| | | | |
|---|---|---|---|
| 3,305,767 | 2/1967 | Beihl et al. | 323/282 |
| 3,434,030 | 3/1969 | Bedford | 363/20 |
| 3,443,195 | 5/1969 | Hoffman, Jr. et al. | 363/20 |
| 3,740,639 | 6/1973 | Easter | 363/21 |
| 3,835,368 | 9/1974 | Williams | 323/282 X |
| 4,030,024 | 6/1977 | Chambers et al. | 323/282 X |
| 4,194,147 | 3/1980 | Payne et al. | 323/272 X |
| 4,417,197 | 11/1983 | Schwarz | 323/272 |

FOREIGN PATENT DOCUMENTS 52-54918  4/1977  Japan .................................. 363/15

*Primary Examiner*—Patrick R. Salce
*Assistant Examiner*—Emanuel Todd Voeltz
*Attorney, Agent, or Firm*—William J. Beard

[57] ABSTRACT

In the preferred and illustrated embodiment of a DC to DC power converter in a sonde and exposed to high temperatures, a transformer with primary and secondary provides AC to a full wave rectifier bridge. The bridge output is DC with ripple on it. The bridge output is connected serially to the primary winding and also to a shunt capacitor. The circuit provides high temperature performance including slower switching speeds, reduced power dissipation and wider current range.

11 Claims, 2 Drawing Sheets

HYBRID SWITCHING CIRCUIT IN A DC TO DC CONVERTER

BACKGROUND OF THE DISCLOSURE

In the well logging industry, it is necessary for a sonde lowered on a logging cable into a well to operate at temperatures which approach 200° C. While the precise temperature will vary depending upon well depth and other circumstances, there is a marked temperature increase acting on circuit components enclosed in the sonde. This particularly has substantial impact on power supply components. Particularly troublesome are DC to DC converters which utilize field effect transistors to accomplish switching. With increased temperature, the switching speed of the FET decreases. Moreover, heat dissipation from the FET increases yielding thermal runaway in the FET.

The temperature increase impacts components other than the FETs. Distributed circuit resistance values increase with temperature and this is a factor in power supply transformers. While protective circuit components can be added (as an example, clamping diodes which limit voltage levels in the circuit), this is a difficult requirement in obtaining a DC to DC converter suitable for installation in a sonde. This inevitably requires that the circuit operate at high temperatures, always subject to the possibility of thermal runaway. The apparatus of this disclosure is a DC to DC converter circuit having an improved arrangement of components which reduce the performance requirements on the FET switches and the other circuit components. One mode of improving component performance is the incorporation of a high speed FET switch to increase the frequency of switching, thereby reducing ripple filtering problems, smoothing the operation of the rectifier system and providing other benefits. The switching time of the FET is stretched on exposure to high temperature. This apparatus enables a slower switching speed and yet it is accomplished with a transformer of reduced size. This loads the switch with a different impedance. It also reduces voltage stress on transformer winding voltage flyback. As the flyback peaks increase, a more expensive and heavy duty design is ordinarily required. The DC to DC converter of this disclosure enables operation at high temperatures more readily. The apparatus utilizes a coupling transformer having a primary terminal connected to the output of a full wave rectifier bridge connected to the transformer secondary. By this arrangement, flyback occurring in the transformer circuit is reduced and transformer power dissipation is also reduced. A wider range of output currents can be drawn from the system. Moreover, it can be driven at lower switching frequencies and still provide a relatively smooth DC output.

DETAILED DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
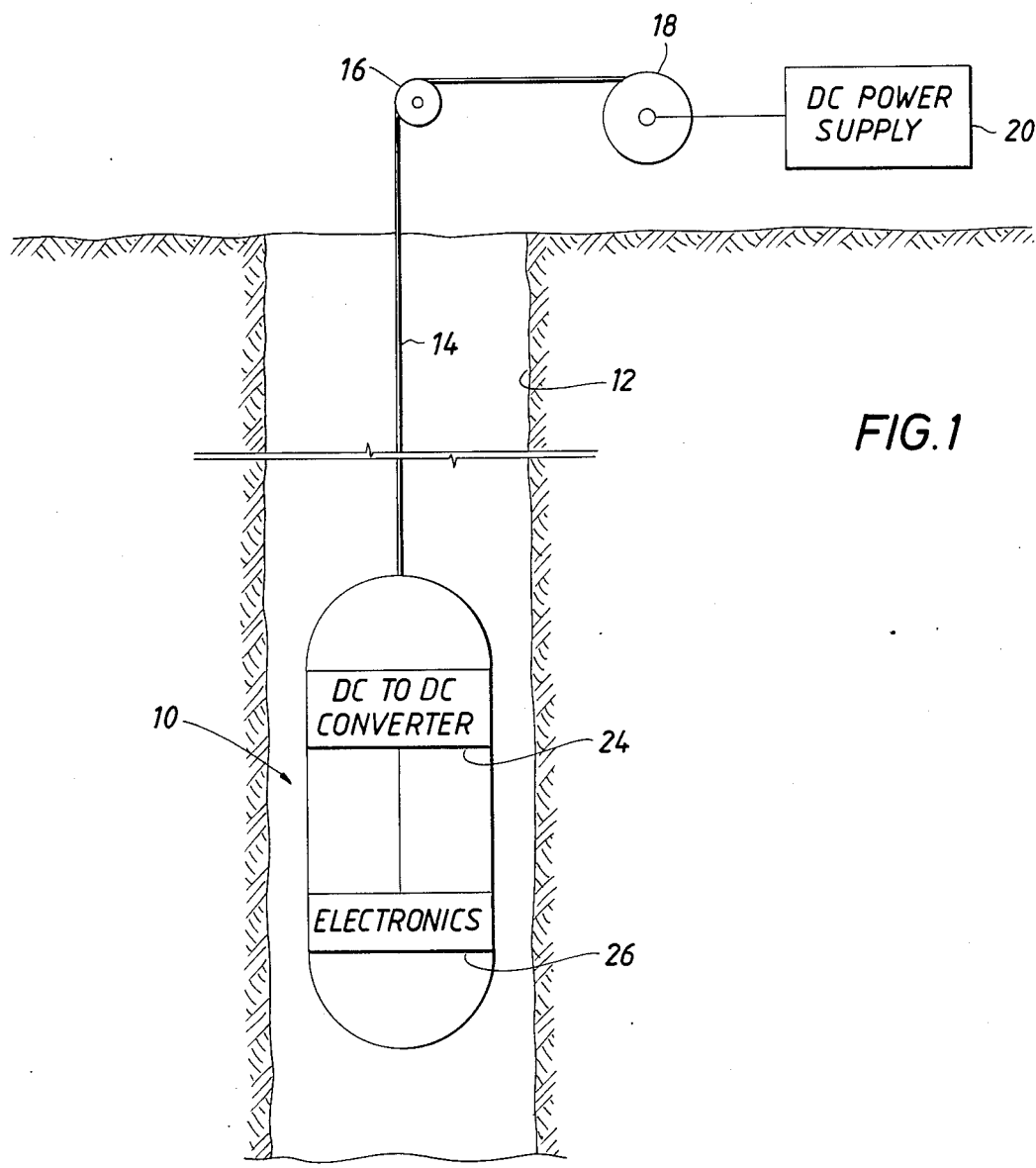
FIG. 1 shows a sonde suspended on a logging cable in a well wherein the sonde encloses a DC to DC power converter for use with electronic circuitry in the sonde.

Attention is first directed to FIG. 1 of the drawings where a sonde 10 is lowered in a well borehole 12 on a logging cable 14. The cable passes over a sheave 16 and is spooled on a drum 18. The drum can hold several thousand feet of logging cable so that the sonde 10 can be lowered to great depths, even as deep as 30,000 feet in the well. At depths such as this, the operating temperature in the sonde approach 200° C. As depths increase, the operating temperature also increases. As wells are drilled deeper in the future, the operating temperatures will likewise increase.

FIG. 1 further shows a DC power supply 20. It is connected to a conductor in the logging cable 14. It is possible to place all DC power supplies at the surface. If this is done, the number of conductors in the logging cable is increased. Because of the great variety of voltages required including voltages which may exceed 1,000 volts for operation of voltage neutron sources (as an example) and because there are other voltages required for operation of the solid state circuitry enclosed in the sonde, the number of voltage levels might be numerous. It is not uncommon to require five volts to operate integrated circuitry. Likewise, it might not be uncommon to require 12 volts DC and perhaps 20 volts DC to operate other circuitry. Extending the example, it is possible that six or eight DC voltage levels are required in the sonde 10. If all the power supplies are located at the surface, this requires a separate conductor for each power supply at the surface. This makes the logging cable unduly complex. As the number of conductors in the logging cable is reduced, thereby making the logging cable less expensive and more reliable, it is necessary to place power supplies in the sonde 10. If this is done, a high voltage can be furnished and DC to DC converters can be used to step down to lower voltages. Accordingly, the power supply 20 connects with a conductor in the logging cable 14 which extends to a DC to DC converter 24 in the sonde 10. It is connected to various electronic circuits 26 for operation of the circuits.

Figure 2:
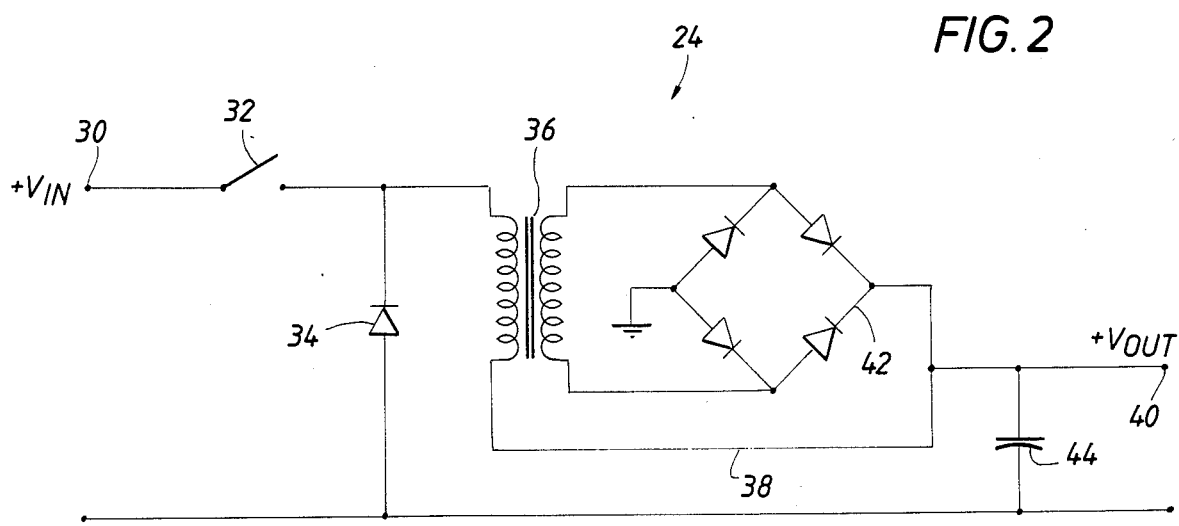
FIG. 2 is a schematic wiring diagram of a DC to DC power converter in accordance with the teachings of the present disclosure providing +VDC output.

Attention is now directed to FIG. 2 of the drawings which illustrates a particular DC to DC power converter in accordance with the teachings of this disclosure. The circuit 24 includes an input terminal 30 connected with a suitable high voltage DC level as might be furnished by the DC power supply 20 as shown in FIG. 1. This provides a current to a switch 32. It is typically an FET transistor switch. Representative values of switching speed and input voltage will be given hereafter. The switch is protectively grounded by a clamping diode 34. The switch provides current flow to the primary of a transformer 36. The transformer 36 has a primary with one terminal of the primary being connected to the switch. The other terminal of the primary is connected by means of a conductor 38 to an output terminal 40. More will be noted regarding this connection.

The transformer 36 incorporates a secondary winding which is connected to a full wave rectifier bridge circuit 42. The bridge 42 is made of four diodes connected with the polarities arranged such that the transformer secondary provide peaks which are rectified, therebeing two such peaks per operating cycle of the switch 32 to thereby define full wave rectification, and DC is output to the conductor 38. The output terminal is connected to ground through a capacitor 44 which filters AC ripple in the output signal so that the output voltage is primarily a DC level which has been substantially filtered to remove most of the AC component.

In describing operation of the circuit shown in FIG. 2, consider the interaction of the transformer 36 and the capacitor 44. So to speak, the transformer 36 appears as an inductor in series with capacitor. The inductor and capacitor 44 may be considered to form a resonant tank circuit. By selection of a suitable frequency for driving the switch 32, the tank circuit can be pulsed as the switch is operated. Consider the operation of the circuit in the following fashion. The switch is operated at a frequency which provides pulses to the tank circuit having a relationship to the resonant frequency of the tank circuit. The tank circuit is driven into oscillation at the selected resonant frequency. This causes large voltage swings in the tank circuit. To the extent that the swings are significantly negative and thus provide a negative voltage at the switch 32, such flyback voltages are clipped by the diode 34.

Referring to FIG. 2, it will be understood that the transformer 36 is something other than a series inductor cooperating with the capacitor 44 to form a tank circuit. Voltage swings in the primary of the transformer 36 are reflected through the transformer to form pulsating DC at the output of the bridge circuit 42. The pulsating DC is smoothed by operation of the filtering capacitor 44. This smoothing reduces the AC ripple on the output voltage at 40. The AC ripple is filtered whereby the high frequency components on the output conductor are simply shunted to the ground. Depending on the measure of filtration required, the capacitor substantially enables the output terminal 40 to provide a relatively pure DC level.

Consider a situation where the voltage at the input terminal 30 is 30 volts DC. Assume that the desired voltage from the output terminal is 12 volts. Assume also that the switch 32 is operated at a frequency of 400 CPS. Given these representative values for a particular converter, the capacitor 44 primarily shunts to ground the AC ripple of 800 CPS and any higher harmonics in the AC ripple. The primary of the transformer 36 causes a drop sufficient across the primary that the primary conductor 38 is sustained at approximately 12 volts. Moreover, this arrangement is protected by the clamping diode 34 such that the input terminal of the primary does not drop negative relative to ground.

Figure 3:
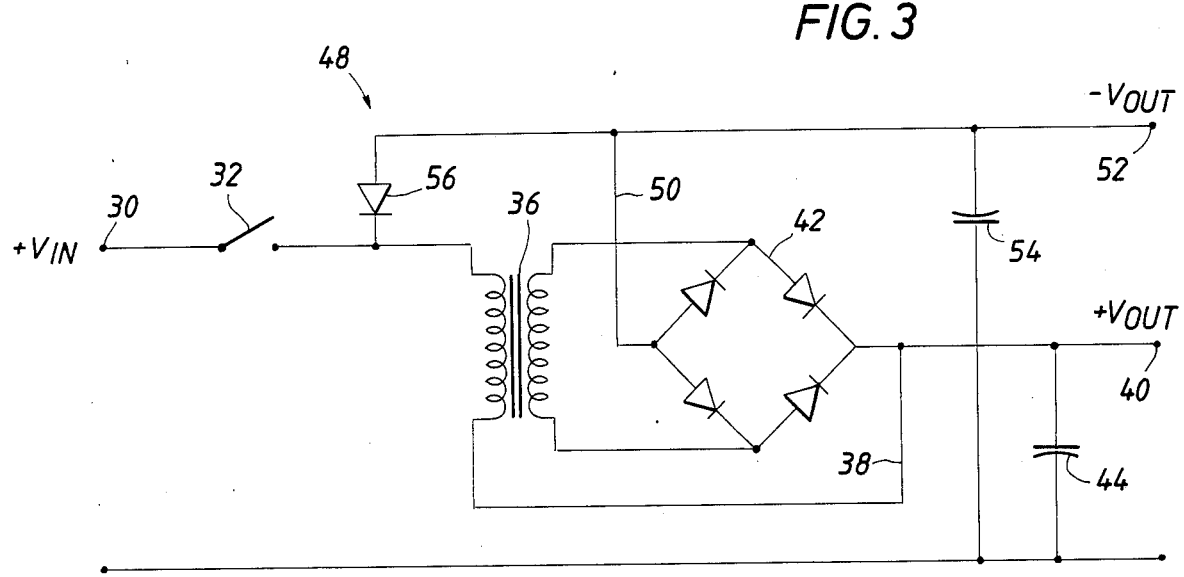
FIG. 3 is a circuit similar to FIG. 2 wherein the output is +/−VDC output.

Attention is now direced to FIG. 3 of the drawings which show a circuit indicated generally as 48 and which is similar to the structure shown in FIG. 2. The circuit 48 is a similar circuit to that of FIG. 2 with an enhanced output arrangement. Thus, components which correspond to the arrangement shown at 24 in FIG. 2 bear similar reference numerals. Therefore, the system provides an output voltage on the conductor 38 which again is connected to the output terminal 40. Instead of grounding the diode rectifier bridge 42, the center point of the bridge is tapped through a conductor 50 and is connected with an output terminal 52. The conductor 50 is also connected with a filtering capacitor 54 similar to the capacitor 44. Voltage flyback is limited by a clamping diode 56. The diode 56 corresponds to the clamping diode 34 previously mentioned. Instead of being connected to ground, it is connected to the negative conductor 52. The circuitry shown in FIG. 3 of the drawings forms the same output voltage as that circuitry shown at 24 in FIG. 2 assuming circuit components and voltages are the same. However, it provides this output voltage with opposite polarity at the terminal 52 as well as with conventional polarity at the terminal 40. Thus, the diode bridge in FIG. 3 operates in the same fashion as the bridge in FIG. 2. The difference is the provision of the conductor 50 and capacitor 54 shown in FIG. 3 to furnish $+/-$VDC.

Figure 4:
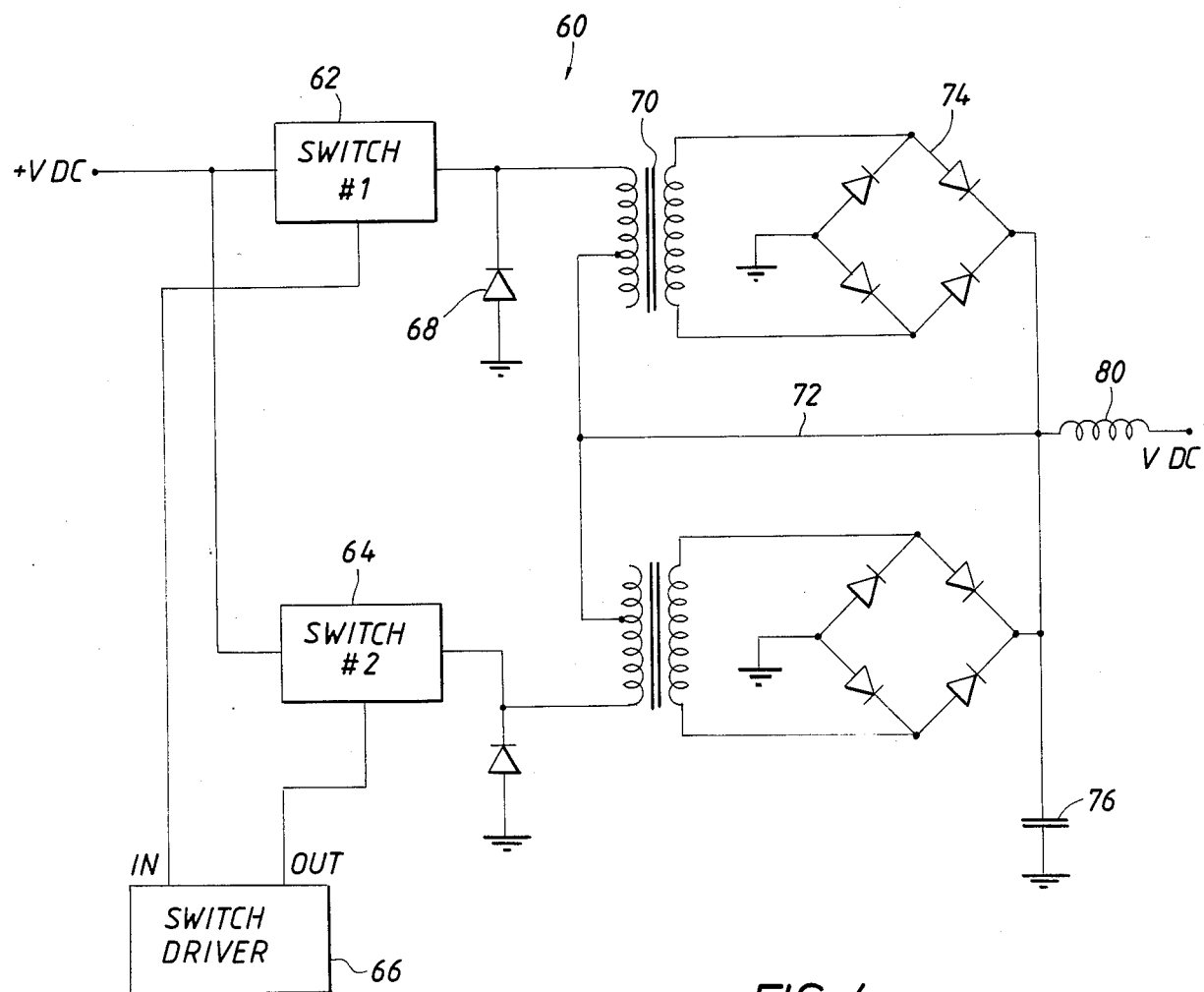
FIG. 4 is a schematic wiring diagram of a pushpull dual switch DC to DC power converter system in accordance with the teachings of the disclosure.

Attention is now directed to the embodiment shown in FIG. 4 of the drawings. There, the numeral 60 identifies generally this particular embodiment. It is constructed with an input terminal connected to a suitable positive DC voltage source. The input is connected to a first switch 62. A duplicate switch 64 is connected to the same source. The switches 62 and 64 are driven by a switch driver 66 that forms two output signals, the two signals being at the same frequency and in phase with opposition one another. The circuit 66 can be, for example, a convenient flip flop with output stages providing the two signals at a common frequency. The two switch circuits are connected to duplicate circuits. That is, the switch 62 connects to a circuit which is a duplicate of the circuit connected to the switch 64. They provide a summed output as will be described. It is convenient to describe only one of the two such they are duplicate in other regards.

The numeral 68 identifies a clamping diode which prevents flyback voltage from dropping below ground. The switch 62 is input to the primary of a transformer 70. The primary is center tapped, and this is connected to the common output conductor 72. This conductor corresponds to the conductor 38 shown in the earlier embodiments. Full wave rectification from the diode rectifier bridge is obtained. The bridge 74 forms output current for the conductor 72. This conductor is grounded through a suitable grounding capacitor 76 which shunts AC components to ground. The output is provided through a choke 80 which reduces output ripple.

The switch 64 is connected in the same fashion to a duplicate circuit which also connects to the output conductor 72. The two converters form a common output voltage. The ripple is at the same frequency. While they are out of phase with one another by 180°, this is no problem because the summed currents have a common voltage level and the two sets of ripple are at a common frequency. Twice the current can be obtained at the output conductor while the ripple remains substantially the same. Grounding of AC components is obtained through the capacitor 76. The inductance 80 limits the ripple in the output current. The impedance presented to the AC components is thus quite sizable at the output terminal where the AC components are readily shunted to ground.

Represenative frequencies for operation of the embodiments 24, 48, and 60 can range upwards of 1,000

CPS. They also can range quite low, this being in part determined by the amount of capacitance and the amount of ripple tolerated in the output current. The ratio of drop can vary quite widely. Thus, the DC to DC converter can provide an output voltage which is 95% of the input, and this can be dropped as low as 10%. Typical operating values depend on the ratings of the components. Use of an input voltage is high as 1,000 volts DC appears to be about the maximum reasonable limit in view of the fact that FET switching transistors typically have a limit of about 900 volts. Of course, multiple transistor arrangements can be used so that higher voltages can be switched. In general terms, it is desirable that the input voltage be less than about 900 volts DC so that readily available and less expensive switching circuits can be implemented.

In operation, the converter 24 is place in sonde 10. It is connected to a suitable electronic circuit 26 which requires a step down voltage. This equipment is exposed to extremely high temperature during operation. Even though the temperature might go to 200° C., the circuit operates quite readily with reduced primary transformer impedance, a wider power output range (reflected in a wider range of output current), and is able to sustain operation at lower switching frequencies.

While the foregoing is directed to the preferred embodiment, the scope is determined by the claims which follow.

What is claimed is:

1. For use in a well logging sonde lowered on a logging cable, a high temperature DC to DC converter comprising:
   (a) a transformer having two separate windings, the windings being
      (1) a primary winding with two terminals, and
      (2) a secondary winding with two terminals;
   (b) a full wave rectifier bridge having
      (1) a pair of input terminals connected to the two terminals of said transformer secondary winding, and
      (2) a pair of output terminals for forming thereacross a DC output voltage having an AC ripple component thereon resulting from rectifying action of said rectifier bridge;
   (c) an output circuit having an output means connected to one of the pair of output terminals of said rectifier bridge to obtain a DC voltage having a polarity determined by selection of the output terminals of said rectifier bridge; and
   (d) wherein one of said transformer primary terminals is connected to a chopped DC supply source for said transformer, and the opposite primary terminal is connected for feedback from said output means thereby reducing flyback voltage in the transformer circuit and reducing transformer power dissipation.

2. The converter of claim 1 wherein said output circuit includes a filter capacitor connector to shunt said AC ripple component current from said output means.

3. The converter of claim 1 wherein said output circuit includes a series inductance to reduce output ripple.

4. The converter of claim 1 wherein said output circuit includes a capacitor connected to form a series tank circuit with said transformer primary winding and wherein said tank circuit rings when pulsed at a selected frequency.

5. The converter of claim 4 including a clamping diode connected to limit ringing voltage peaks across said transformer.

6. The converter of claim 4 wherein said capacitor is connected to ground.

7. The converter of claim 1 wherein said output terminals of said rectifier bridge are connected to said output means and ground to define a voltage thereacross.

8. The converter of claim 1 wherein said output terminals of said rectifier bridge are connected to said output means and a second output means to define a DC voltage thereacross.

9. The converter of claim 1 wherein the remaining one of said output terminals of said rectifier bridge is grounded.

10. The converter of claim 1 cooperative with a second and similar converter wherein said two converters are provided with a DC voltage applied to first and second electronic switches, and including switch driver means driving said switches with switching signals differing by 180° phase difference.

11. The two converter system of claim 10 wherein the two converters connect to a common output means.

* * * * *